United States Patent
Cai et al.

(10) Patent No.: US 11,009,355 B2
(45) Date of Patent: May 18, 2021

(54) METHOD AND APPARATUS FOR POSITIONING VEHICLE

(71) Applicant: Baidu Online Network Technology (Beijing) Co., Ltd., Beijing (CN)

(72) Inventors: Renlan Cai, Beijing (CN); Xiaolong Yang, Beijing (CN); Guowei Wan, Beijing (CN); Weixin Lu, Beijing (CN); Shiyu Song, Beijing (CN); Baoqiang Xu, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 616 days.

(21) Appl. No.: 15/876,008

(22) Filed: Jan. 19, 2018

(65) Prior Publication Data

US 2018/0299273 A1 Oct. 18, 2018

(30) Foreign Application Priority Data

Apr. 17, 2017 (CN) .......................... 201710249842.4

(51) Int. Cl.
*G01C 21/30* (2006.01)
*G01S 17/86* (2020.01)
(Continued)

(52) U.S. Cl.
CPC ............ *G01C 21/30* (2013.01); *G01S 7/4808* (2013.01); *G01S 17/00* (2013.01); *G01S 17/42* (2013.01);
(Continued)

(58) Field of Classification Search
CPC ....... G01C 21/30; G01C 21/165; G01S 17/86; G01S 17/42; G01S 17/89; G01S 17/00; G01S 7/4808; G01S 17/88; G01S 19/47; G01S 19/48; G05D 1/027; G05D 1/0231; G05D 1/024; G05D 1/0268; G05D 1/0278;
(Continued)

(56) References Cited

U.S. PATENT DOCUMENTS 9,953,236 B1* 4/2018 Huang ...................... G06K 9/34
2009/0099774 A1* 4/2009 Takac ................... A01B 79/005
701/472

(Continued)

*Primary Examiner* — Frederick M Brushaber
(74) *Attorney, Agent, or Firm* — Knobbe Martens Olson & Bear LLP

(57) ABSTRACT

The present disclosure discloses a method and apparatus for positioning a vehicle. In some embodiments, the method comprises: acquiring an a priori position of a to-be-positioned vehicle at a current positioning moment determined by performing a strapdown calculation between a previous positioning moment and the current positioning moment; determining a map area for searching in a laser point cloud reflected value map; matching a reflected value characteristic of a projection area generated by projecting a real-time laser point cloud, to obtain a map matching position according to a matching result; positioning, using the a priori position in combination with observation data of a vehicle-mounted global navigation satellite system (GNSS) receiver of the vehicle, to obtain a satellite positioning position; and fusing the a priori position, the map matching position and the satellite positioning position to generate a positioning result of positioning the vehicle at the current moment.

21 Claims, 6 Drawing Sheets

(51) Int. Cl.
*G01S 17/42* (2006.01)
*G05D 1/02* (2020.01)
*G01S 17/89* (2020.01)
*G06K 9/00* (2006.01)
*G01S 17/00* (2020.01)
*G01S 7/48* (2006.01)
*G08G 1/137* (2006.01)

(52) U.S. Cl.
CPC .............. *G01S 17/86* (2020.01); *G01S 17/89* (2013.01); *G05D 1/024* (2013.01); *G05D 1/027* (2013.01); *G05D 1/0231* (2013.01); *G05D 1/0257* (2013.01); *G05D 1/0268* (2013.01); *G05D 1/0278* (2013.01); *G06K 9/00791* (2013.01); *G05D 2201/0213* (2013.01); *G08G 1/137* (2013.01)

(58) Field of Classification Search
CPC ......... G05D 1/0257; G05D 2201/0213; G06K 9/00791; G08G 1/137
See application file for complete search history.

(56) References Cited

U.S. PATENT DOCUMENTS

| | | | |
|---|---|---|---|
| 2011/0115669 A1* | 5/2011 | Milyutin | G01S 19/20 342/357.27 |
| 2017/0046840 A1* | 2/2017 | Chen | G06K 9/4604 |
| 2018/0188359 A1* | 7/2018 | Droz | G01S 7/4817 |
| 2018/0188380 A1* | 7/2018 | Venkatraman | G01S 19/49 |
| 2018/0189574 A1* | 7/2018 | Brueckner | G06K 9/00791 |

* cited by examiner

METHOD AND APPARATUS FOR POSITIONING VEHICLE

CROSS-REFERENCE TO RELATED APPLICATION

This application claims the benefit of Chinese Application No. 201710249842.4, filed on Apr. 17, 2017 and entitled "Method and Apparatus for Positioning Vehicle", the entire disclosure of which is hereby incorporated by reference.

TECHNICAL FIELD

The present disclosure relates to the field of computer technology, specifically to the field of positioning technology, and more specifically to a method and apparatus for positioning a vehicle.

BACKGROUND

Positioning technology is one of the core technologies of the autonomous driving system in a driverless vehicle. Positioning output is the key input of the perception, path planning and other operations in the autonomous driving system. Positioning technology requires performances such as high precision, reliability, availability and superior continuity, in order to meet the needs of driverless vehicle application scenarios.

However, the existing positioning methods usually use a single technology for positioning, and each positioning technology has some inherent defects. Therefore, the output position accuracy is low and cannot meet the needs of the autonomous driving as well as other fields requiring accurate positioning.

SUMMARY

The present disclosure provides an improved method and apparatus for positioning a vehicle, in order to solve the technical problem mentioned in the foregoing Background section.

In a first aspect, an embodiment of the present disclosure provides a method for positioning a vehicle, the method comprising: acquiring an a priori position of a to-be-positioned vehicle at a current positioning moment determined by performing a strapdown calculation between a previous positioning moment and the current positioning moment by a vehicle-mounted inertial navigation system of the to-be-positioned vehicle; determining a map area for searching and including a predetermined range in a laser point cloud reflected value map by using the a priori position; matching a reflected value characteristic of a projection area generated by projecting a real-time laser point cloud collected by scanning a surrounding environment by a vehicle-mounted laser radar of the vehicle at the current positioning moment with a reflected value characteristic of the map area for searching, to obtain a map matching position according to a matching result; positioning, using the a priori position in combination with observation data of a vehicle-mounted global navigation satellite system (GNSS) receiver of the vehicle, to obtain a satellite positioning position; and fusing the a priori position, the map matching position and the satellite positioning position to generate a positioning result of positioning the vehicle at the current moment.

In some embodiments, the method further comprises: time-updating a Kalman filter including a vehicle position deviation, a vehicle speed deviation, a vehicle attitude deviation, a zero bias deviation of an accelerometer and a gyroscope in the vehicle-mounted inertial navigation system of the vehicle at each positioning moment and a clock offset and a clock drift of the vehicle-mounted global navigation satellite system (GNSS) receiver as state variables; and, the fusing the a priori position, the map matching position and the satellite positioning position to generate a positioning result of positioning the vehicle at the current moment comprises: determining a difference between the map matching position and the a priori position and/or a difference between the satellite positioning position and the a priori position as an observation value of the Kalman filter, and measurement-updating the Kalman filter; and amending the a priori position by using a measurement-updated vehicle position deviation to generate the positioning result.

In some embodiments, the matching a reflected value characteristic of a projection area generated by projecting a real-time laser point cloud collected by scanning a surrounding environment by a vehicle-mounted laser radar of the vehicle at the current positioning moment with a reflected value characteristic of the map area for searching, to obtain a map matching position according to a matching result, comprises: calculating measurement matching probabilities of matching the reflected value characteristic of the projection area with reflected value characteristics of map areas corresponding to sample positions of the map area for searching; and generating a coordinate of the map matching position, based on coordinates of the sample positions and the corresponding measurement matching probabilities.

In some embodiments, the matching a reflected value characteristic of a projection area generated by projecting a real-time laser point cloud collected by scanning a surrounding environment by a vehicle-mounted laser radar of the vehicle at the current positioning moment with a reflected value characteristic of the map area for searching, to obtain a map matching position according to a matching result further comprises: for each sample position, overlapping a center of the projection area with the sample position, and determining an area in the laser point cloud reflected value map overlapping the projection area as the map area corresponding to the sample position.

In some embodiments, the method further comprises steps for generating laser point cloud reflected value map, comprising: dividing a ground plane of an earth surface in a world coordinate system into a plurality of map grids of a same size and shape, each map grid corresponding to a sample position; and storing a reflected value characteristic of a sample laser point cloud collected for each sample position in a map grid corresponding to the sample position.

In some embodiments, the reflected value characteristic comprises a reflected value mean of the laser point cloud; and the calculating measurement matching probabilities of matching the reflected value characteristic of the projection area with reflected value characteristics of map areas corresponding to sample positions comprises: determining differences of reflected value means between the projection area and the map areas corresponding to the sample positions on the map grids; and weight-averaging the differences of the reflected value means on the map grids, by using a number of laser points corresponding to the projection area in the map grids as a weight, and determining the measurement matching probabilities of matching the reflected value characteristic of the projection area with the reflected value characteristics of the map areas corresponding to the sample positions based on the weight-averaged means.

In some embodiments, determining the map matching position based on measurement matching probabilities of matching the reflected value characteristic of the projection area obtained by projecting the laser point cloud with the reflected value characteristics of the map areas corresponding to the sample positions of the map area for searching, comprises: determining prediction probabilities of the vehicle at the sample positions at the current moment, based on the a priori position and an a priori deviation distribution of the a priori position obtained by time-updating the Kalman filter; amending the measurement matching probabilities by using the prediction probabilities of the sample positions to obtain a posteriori matching probabilities; and weight-averaging the coordinates of the sample positions, by using the a posteriori matching probabilities corresponding to the sample positions as a weight, to obtain the coordinate corresponding to the map matching position.

In some embodiments, the positioning, using the a priori position in combination with observation data of a vehicle-mounted global navigation satellite system (GNSS) receiver of the vehicle, to obtain a satellite positioning position comprises: setting a fused weight of the observation data obtained by observing each positioning satellite at the current moment by the vehicle-mounted GNSS receiver of the vehicle, based on the a priori position.

In some embodiments, the setting a fused weight of the observation data obtained by observing each positioning satellite at the current moment by the vehicle-mounted GNSS receiver of the vehicle, based on the a priori position comprises: calculating a distance between the vehicle and the each positioning satellite based on the a priori position and a satellite position of the each positioning satellite, to obtain a calculated value; acquiring an observation value of the distance between the vehicle and the each positioning satellite obtained by observing each positioning satellite by the vehicle-mounted GNSS receiver, to determine a residual deviation of the distance corresponding to the each positioning satellite; and setting the weight of the observation data corresponding to the positioning satellite based on the residual deviation corresponding to the each positioning satellite, wherein the weight corresponding to the positioning satellite is inversely related to the residual deviation of the distance corresponding to the positioning satellite.

In some embodiments, the positioning, using the a priori position in combination with observation data of a vehicle-mounted global navigation satellite system (GNSS) receiver of the vehicle, to obtain a satellite positioning position comprises: constructing a pseudorange observation equation and a carrier single-difference observation equation between the previous positioning moment and the current moment, setting a difference of the a priori position and the positioning result at the previous positioning moment as an initial value of a coordinate increment in the pseudorange observation equation and the carrier single-difference observation equation; determining and repairing a carrier phrase cycle slip of a global positioning system corresponding to the vehicle-mounted GNSS receiver, based on the pseudorange observation equation and the carrier single-difference observation equation, and performing a robust estimation on the coordinate increment and a clock offset change to obtain an estimated value; constructing a double difference observation equation between a base station corresponding to the GNSS receiver and the GNSS receiver, and setting the estimated value as the initial value of the coordinate increment and the clock offset change in the double difference observation equation; fixing a double difference ambiguity in the double difference observation equation by using a LAMBDA algorithm, to update the coordinate increment and the clock offset change; and determining the satellite positioning position by using the updated coordinate increment and the positioning result at the previous positioning moment.

In a second aspect, an embodiment of the present disclosure provides an apparatus for positioning a vehicle, the apparatus comprising: an a priori position determining unit, configured to acquire an a priori position of a to-be-positioned vehicle at a current positioning moment determined by performing a strapdown calculation between a previous positioning moment and the current positioning moment by a vehicle-mounted inertial navigation system of the to-be-positioned vehicle; an area determining unit, configured to determine a map area for searching and including a predetermined range in a laser point cloud reflected value map by using the a priori position; a matching unit, configured to match a reflected value characteristic of a projection area generated by projecting a real-time laser point cloud collected by scanning a surrounding environment by a vehicle-mounted laser radar of the vehicle at the current positioning moment with a reflected value characteristic of the map area for searching, to obtain a map matching position according to a matching result; a satellite positioning unit, configured to position, using the a priori position in combination with observation data of a vehicle-mounted global navigation satellite system (GNSS) receiver of the vehicle, to obtain a satellite positioning position; and a fusion unit, configured to fuse the a priori position, the map matching position and the satellite positioning position to generate a positioning result of positioning the vehicle at the current moment.

In some embodiments, the apparatus further comprises: a time-updating unit, configured to time-update a Kalman filter including a vehicle position deviation, a vehicle speed deviation, a vehicle attitude deviation, a zero bias deviation of an accelerometer and a gyroscope in the vehicle-mounted inertial navigation system of the vehicle at each positioning moment and a clock offset and a clock drift of the vehicle-mounted global navigation satellite system (GNSS) receiver as state variables; and, the fusion unit is further configured to: determine a difference between the map matching position and the a priori position and/or a difference between the satellite positioning position and the a priori position as an observation value of the Kalman filter, and measurement-update the Kalman filter; and amend the a priori position by using a measurement-updated vehicle position deviation to generate the positioning result.

In some embodiments, the matching unit comprises: a calculation subunit, configured to calculate measurement matching probabilities of matching the reflected value characteristic of the projection area with reflected value characteristics of map areas corresponding to sample positions of the map area for searching; and a generation subunit, configured to generate a coordinate of the map matching position, based on coordinates of the sample positions and the corresponding measurement matching probabilities.

In some embodiments, the matching unit further comprises: a determining subunit, configured to, for each sample position, overlap a center of the projection area with the sample position, and determine an area in the laser point cloud reflected value map overlapping the projection area as the map area corresponding to the sample position.

In some embodiments, the apparatus further comprises a laser point cloud reflected value map generation unit, configured to: divide a ground plane of an earth surface in a world coordinate system into a plurality of map grids of a same size and shape, each map grid corresponding to a sample position; and store a reflected value characteristic of a sample laser point cloud collected for each sample position in a map grid corresponding to the sample position.

In some embodiments, the reflected value characteristic comprises a reflected value mean of the laser point cloud; and, the calculation subunit is further configured to: determine differences of reflected value means between the projection area and the map areas corresponding to the sample positions on the map grids; and weight-average the differences of the reflected value means on the map grids, by using a number of laser points corresponding to the projection area in the map grids as a weight, and determine the measurement matching probabilities of matching the reflected value characteristic of the projection area with the reflected value characteristics of the map areas corresponding to the sample positions based on the weight-averaged means.

In some embodiments, the generation subunit is further configured to: determine prediction probabilities of the vehicle at the sample positions at the current moment, based on the a priori position and an a priori deviation distribution of the a priori position obtained by time-updating the Kalman filter; amend the measurement matching probabilities by using the prediction probabilities of the sample positions to obtain a posteriori matching probabilities; and weight-average the coordinates of the sample positions, by using the a posteriori matching probabilities corresponding to the sample positions as a weight, to obtain the coordinate corresponding to the map matching position.

In some embodiments, the satellite positioning unit comprises: a setting subunit, configured to set a fused weight of the observation data obtained by observing each positioning satellite at the current moment by the vehicle-mounted GNSS receiver of the vehicle, based on the a priori position.

In some embodiments, the setting subunit is further configured to: calculate a distance between the vehicle and the each positioning satellite based on the a priori position and a satellite position of the each positioning satellite, to obtain a calculated value; acquire an observation value of the distance between the vehicle and the each positioning satellite obtained by observing each positioning satellite by the vehicle-mounted GNSS receiver, to determine a residual deviation of the distance corresponding to the each positioning satellite; and set the weight of the observation data corresponding to the positioning satellite based on the residual deviation corresponding to the each positioning satellite, wherein the weight corresponding to the positioning satellite is inversely related to the residual deviation of the distance corresponding to the positioning satellite.

In some embodiments, the satellite positioning unit further comprises a cycle slip repairing subunit, configured to: construct a pseudorange observation equation and a carrier single-difference observation equation between the previous positioning moment and the current moment, and set a difference of the a priori position and the positioning result at the previous positioning moment as an initial value of a coordinate increment in the pseudorange observation equation and the carrier single-difference observation equation; determine and repair a carrier phrase cycle slip of a global positioning system corresponding to the vehicle-mounted GNSS receiver, based on the pseudorange observation equation and the carrier single-difference observation equation, and perform a robust estimation on the coordinate increment and a clock offset change to obtain an estimated value; construct a double difference observation equation between a base station corresponding to the GNSS receiver and the GNSS receiver, and set the estimated value as the initial value of the coordinate increment and the clock offset change in the double difference observation equation; fix a double difference ambiguity in the double difference observation equation by using a LAMBDA algorithm, to update the coordinate increment and the clock offset change; and determine the satellite positioning position by using the updated coordinate increment and the positioning result at the previous positioning moment.

In a third aspect, an embodiment of the present disclosure provides a vehicle, comprising: one or more processors; a storage apparatus, to store one or more programs; a vehicle-mounted GNSS receiver, and a vehicle-mounted inertial navigation system and a vehicle-mounted laser radar; wherein the one or more programs, when executed by the one or more processors, cause the one or more processors to perform the method as described by any one of the first aspect.

In a fourth aspect, an embodiment of the present disclosure provides a positioning server, comprising: one or more processors; and a storage apparatus, to store one or more programs; wherein the one or more programs, when executed by the one or more processors, cause the one or more processors to perform the method as described by any one of the first aspect.

In a fifth aspect, the an embodiment of the present disclosure provides a computer readable storage medium, storing a computer program thereon, wherein the computer program, when executed by a processor, cause the processor to implement the method as described in any one of the first aspect.

The method and apparatus for positioning a vehicle provided by the present disclosure uses the a priori position predicted by the inertial navigation system to determine the map area for searching for map matching, and may use the a priori position to assist satellite positioning, such that the computational amount in the map matching flow and the satellite positioning may be greatly reduced based on the a priori position, and the processing efficiency of the fusion positioning is greatly improved, thus the positioning data of the three modes can be timely fused to generate an accurate positioning result.

BRIEF DESCRIPTION OF THE DRAWINGS

After reading detailed descriptions of non-limiting embodiments with reference to the following accompanying drawings, other characteristics, objectives and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
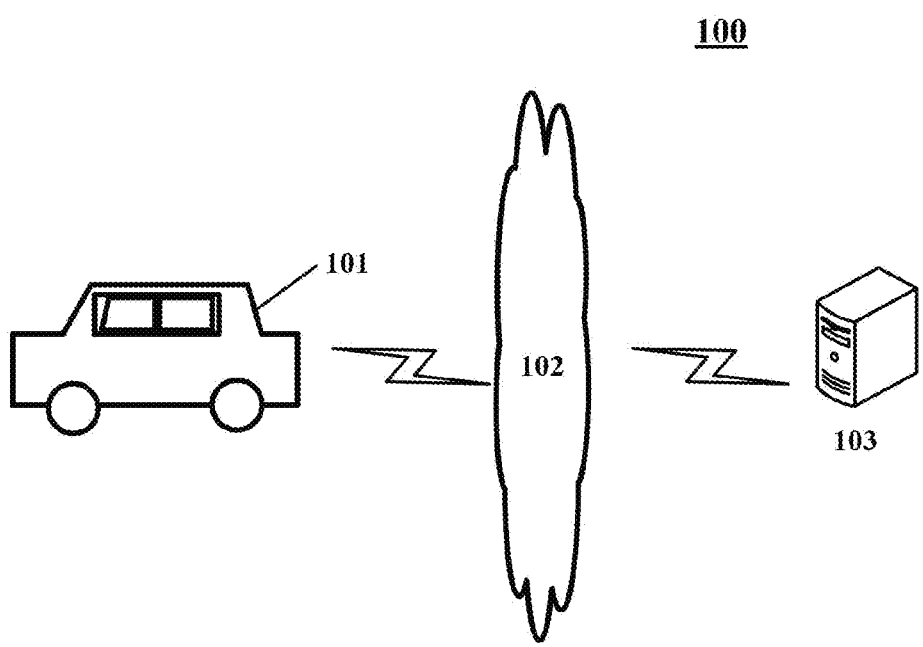
FIG. 1 is a system architecture diagram in which the present disclosure may be applied according to some embodiments.

FIG. 1 shows an architecture of a system 100 which may be used by a method or apparatus for positioning a vehicle according to some embodiments of the present disclosure.

As shown in FIG. 1, the system architecture 100 may include a vehicle 101, a network 102 and a server 103. The network 102 serves as a medium providing a communication link between the vehicle 101 and the server 103. The network 102 may include various types of connections, such as wired or wireless transmission links, or optical fibers.

The vehicle 101 may interact with the server 103 through the network 102 to receive or send messages and the like. The vehicle 101 may be equipped with a laser point cloud collection apparatus, a communication apparatus, a processor, or the like.

The server 103 may be a server that provides various services, for example, a server that processes laser point cloud reflected value data collected by the vehicle 101. The server 103 may process such as analyze the received laser point cloud reflected value data and feed back the processing result (for example, positioning information of the vehicle) to the vehicle 101.

It should be noted that the method for positioning a vehicle provided by the embodiments of the present disclosure may be executed by the vehicle 101, or may be executed by the server 103, or a part of the steps is executed by the vehicle 101 and the other part of the steps is executed by the server 103. Accordingly, the apparatus for positioning a vehicle may be provided in the server 103, or in the vehicle 101, or a part of modules is provided in the server 103 and the other part is provided in the vehicle 101.

It should be understood that the numbers of the vehicle 101, the network 102 and the server 103 in FIG. 1 are merely illustrative. Any number of the vehicle 101, the network 102 and the server 103 may be provided based on the implementation requirements.

Figure 2:
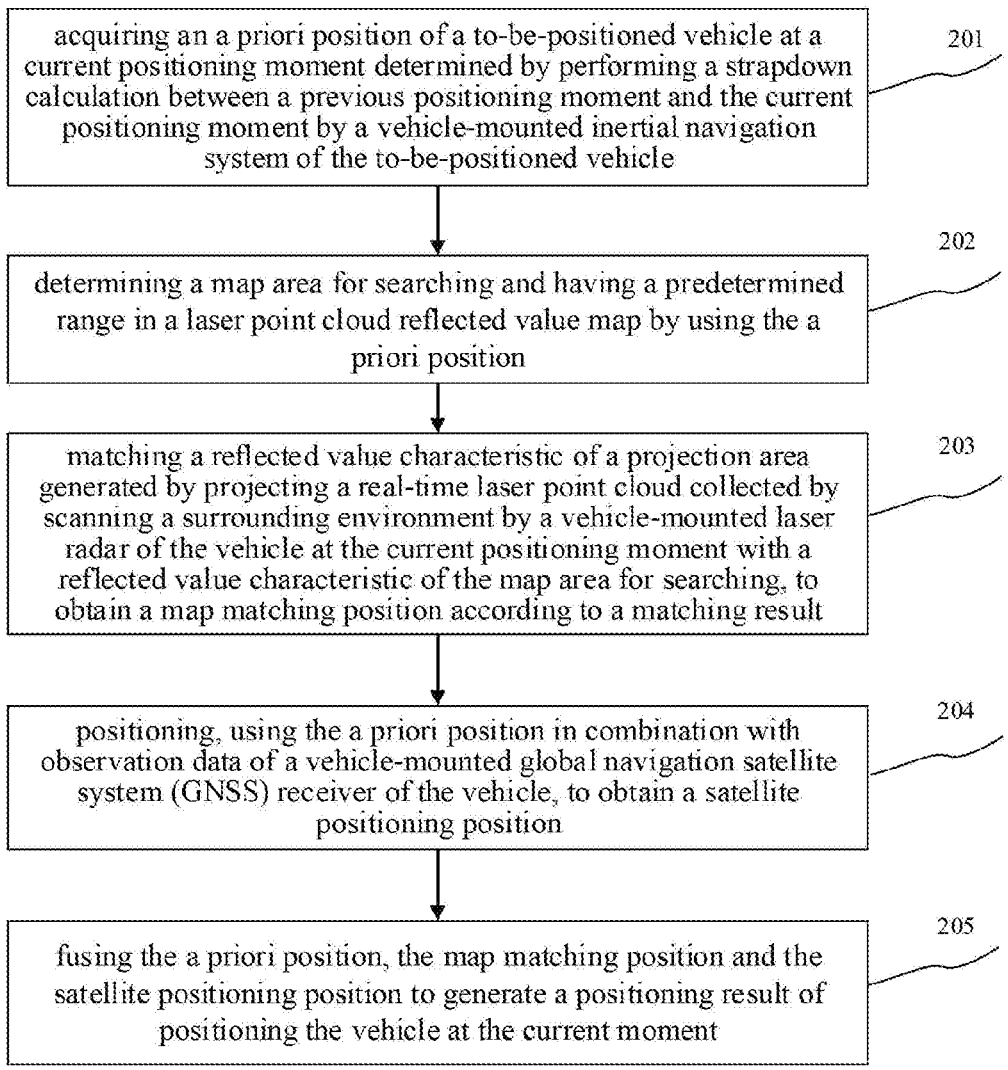
FIG. 2 is a flowchart of a method for positioning a vehicle according to some embodiments of the present disclosure.

With further reference to FIG. 2, a flow 200 of an embodiment of a method for positioning a vehicle according to the present disclosure is illustrated. The vehicle may be equipped with vehicle-mounted devices that may be used for positioning such as a vehicle-mounted GNSS receiver, a vehicle-mounted inertial navigation system, and a vehicle-mounted laser radar. The method for positioning a vehicle includes the following steps:

Step 201, acquiring an a priori position of a to-be-positioned vehicle at a current positioning moment determined by performing a strapdown calculation between a previous positioning moment and the current positioning moment by a vehicle-mounted inertial navigation system of the to-be-positioned vehicle.

In some embodiments, a vehicle-mounted inertial navigation system may be mounted on the vehicle on which the method for positioning a vehicle operate, and an accelerometer and a gyroscope may be included in the vehicle-mounted inertial navigation system. The vehicle-mounted inertial navigation system may be calculated by the strapdown inertial navigation, to obtain a priori position of the vehicle at each positioning moment. Specifically, the vehicle-mounted inertial navigation system may integrate based on the accelerated speed and the angular velocity measured by the accelerometer and the gyroscope based on the positioning result determined at the previous positioning moment, so as to determine the a priori position of the vehicle at the current positioning moment using a position change amount and an attitude change amount of the vehicle between the previous positioning moment and the current positioning moment, and the positioning result at the previous positioning moment. Typically, the vehicle-mounted inertial navigation system may pre-calibrate zero biases of the accelerated speed and the angular velocity of the accelerometer and gyroscope. Then, the inertial navigation system may also integrate the four elements to calculate the attitude matrix. Based on the value of the accelerated speed, the speed integral is completed after harmful acceleration is eliminated, and the position integral update is further completed, so that the position and the attitude change amounts of the vehicle from the previous positioning moment to the current positioning moment are obtained.

Step 202, determining a map area for searching and including a predetermined range in a laser point cloud reflected value map by using the a priori position.

In some embodiments, based on the a priori position obtained in step 201, the electronic device may first determine the map area for searching in the laser point cloud reflected value map using the a priori position. Specifically, the size range of the determined map area for searching may be predetermined, and the specific position of the map area for searching in the laser point cloud reflected value map may be determined based on the a priori position. The laser point cloud reflected value map may be generated based on the reflected value characteristic of each projection area after projecting pre-collected laser point clouds. In this step, the a priori position provided by the inertial navigation system may be used as an initial value of the search area, which can effectively reduce the search range.

Step 203, matching a reflected value characteristic of a projection area generated by projecting a real-time laser point cloud collected by scanning a surrounding environment by a vehicle-mounted laser radar of the vehicle at the current positioning moment with a reflected value characteristic of the map area for searching, to obtain a map matching position according to a matching result.

In some embodiments, the vehicle-mounted laser radar of the vehicle may continuously scan the surrounding environment during positioning to generate laser point cloud frames. The electronic device may project the laser point cloud frames onto a certain plane to obtain a projection area. Typically, when the laser point cloud frames are projected, the data organization structure of the laser point cloud reflected value map may be referred to for subsequent matching. The laser point cloud used can include the same organizational form. Then, the electronic device may match the reflected value characteristic of the map area for searching with the reflected value characteristic of the projection area to determine the position of the vehicle according to the matching result, and the position may be referred to as the map matching position.

Step 204, positioning, using the a priori position in combination with observation data of a vehicle-mounted global navigation satellite system (GNSS) receiver of the vehicle, to obtain a satellite positioning position.

In some embodiments, based on the a priori position obtained in step 201, the electronic device may assist the positioning using the vehicle-mounted GNSS receiver of the vehicle based on the a priori position, for example, the a priori position may be used as a priori position of the GNSS positioning to reduce the computational amount of the computing operation to be performed for positioning and improve the efficiency.

Step 205, fusing the a priori position, the map matching position and the satellite positioning position to generate a positioning result of positioning the vehicle at the current moment.

In some embodiments, the electronic device may fuse-calculate the a priori position, the map matching position and the satellite positioning position according to a certain method to obtain a final positioning result. For example, the deviation of the position may be determined in three different methods and then the deviation may be compensated to obtain the final positioning result.

In some alternative implementations of some embodiments, the method may further include: time-updating a Kalman filter including a vehicle position deviation, a vehicle speed deviation, a vehicle attitude deviation, a zero bias deviation of an accelerometer and a gyroscope in the vehicle-mounted inertial navigation system of the vehicle at each positioning moment and a clock offset and a clock drift of the vehicle-mounted global navigation satellite system GNSS receiver as state variables. In addition, the step 205 may include: fusing the a priori position, the map matching position and the satellite positioning position to generate a positioning result of positioning the vehicle at the current moment, including: determining a difference between the map matching position and the a priori position and/or a difference between the satellite positioning position and the a priori position as an observation value of the Kalman filter, and measurement-updating the Kalman filter; and amending the a priori position by using a measurement-updated vehicle position deviation to generate the positioning result. Here, the time-updating may include the state transition matrix calculation, the gain matrix and noise matrix calculation. During the measurement update, the difference between the satellite positioning position and/or the map matching position and the a priori position of the inertial navigation system may be used as the observation value to estimate optimal values of the position deviation, the speed deviation, the attitude deviation, the accelerometer zero bias, the gyroscope zero bias, the GNSS receiver clock offset and clock drift, thus these optimal values may be used to timely amend the related parameters in order to continue using the method in some embodiments at the next positioning moment. Alternatively, the Kalman filter may be an extended Kalman filter. This implementation utilizes the Kalman filter, and may use the difference between the position provided by the satellite positioning system and/or the map matching process and the a priori position provided by the inertial navigation system as the observation value, estimate the optimal values of the position deviation, the speed deviation, the attitude deviation, the acceleration zero bias, the gyroscope zero bias, the GNSS receiver clock offset and clock drift and other deviations continuously, such that the device measurement accuracy is always maintained at a high standard, and the final output positioning result achieves a high accuracy.

In some alternative implementations of some embodiments, the step 203 may include: calculating measurement matching probabilities of matching the reflected value characteristic of the projection area with reflected value characteristics of map areas corresponding to sample positions of the map area for searching; and generating a coordinate of the map matching position, based on coordinates of the sample positions and the corresponding measurement matching probabilities. In this implementation, the electronic device may match the reflected value characteristic of the projection area with reflected value characteristics of map areas corresponding to sample positions to obtain the matching probabilities matching the sample positions. The matching probability may be referred to as the measurement matching probability. Then, the coordinate of the map matching position may be generated based on the measurement matching probabilities corresponding to the sample positions. For example, the method for determining the map matching position may be that when the measurement matching probability corresponding to a certain sample position is greater than a certain threshold, the sample position is determined as the map matching position, or may be that when the measurement matching probability of a certain sample position is the highest and the difference between this sample position and other sample positions is greater than a certain threshold, the sample position is determined as the map matching position. It should be noted that the electronic device may further process the measurement matching probability using other data, and determine the map matching position based on the further processed data.

Figure 3:
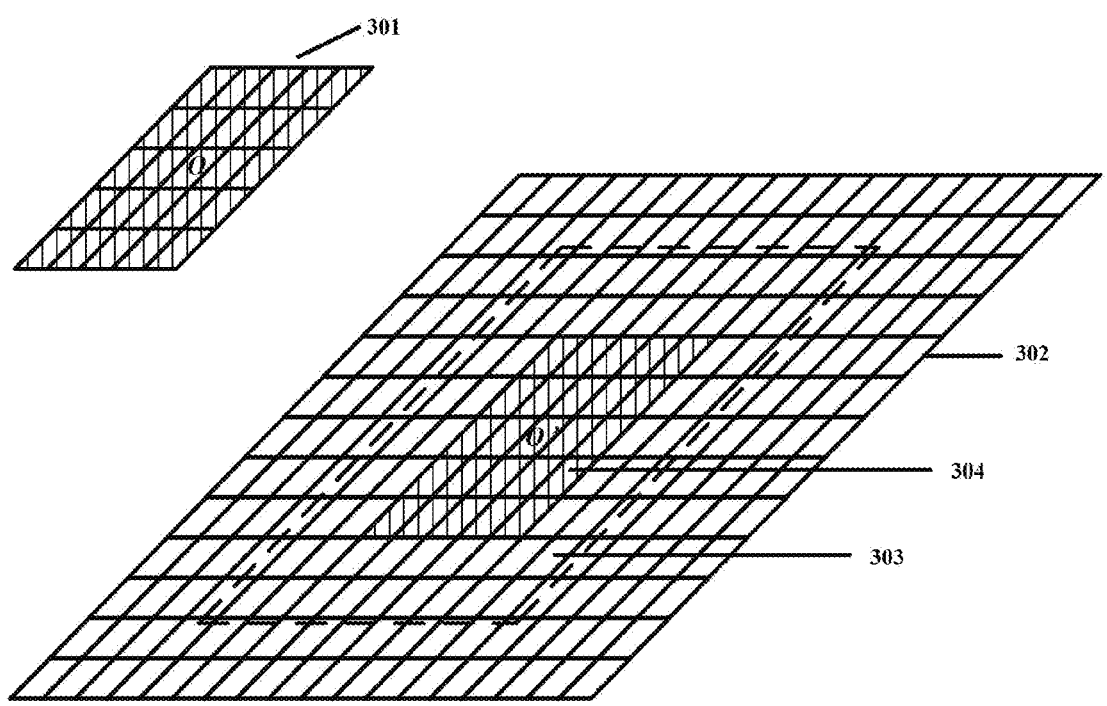
FIG. 3 is a flowchart of a step in the method of the embodiment in FIG. 2 according to some embodiments.

In some alternative implementations of some embodiments, the step 203 may further include: for each sample position, overlapping a center of the projection area with the sample position, and determining an area in the laser point cloud reflected value map overlapping the projection area as the map area corresponding to the sample position. In this implementation, when the sample position overlaps with the center of the projection area, the area in the laser point cloud reflected value map overlapping the projection area may be used for subsequent matching of the reflected value characteristics. As shown in FIG. 3, the projection area 301 is formed by projecting laser point cloud frames. The area illustrated by the dotted box is the to-be-searched area 303 determined in the laser point cloud reflected value map 302 based on the a priori position. The to-be-searched area 303 may be composed of 5×5 map grids. When the measurement matching probability needs to be calculated, the center of the projection area 301 may overlap with the sample position corresponding to each grid in the to-be-searched area 303, and the area in the laser point cloud reflected value map 302 overlapping the projection area 301 is determined as the map area corresponding to the sample position. The slash-shade area 304 in FIG. 3 is the map area corresponding to the sample position when overlapping the center of the projection area 301 with the sample position of a grid in the to-be-searched area 303. At this time, the electronic device may calculate the measurement matching probability of matching the reflected value characteristic of the projection area with the reflected value characteristic of the map area 303 corresponding to the sample position. In the example of FIG. 3, the projection area 301 may overlap with the respective sample positions of 25 map grids in the to-be-searched area, so that the measurement matching probabilities respectively corresponding to the 25 sample positions may be calculated in the subsequent steps.

In some alternative implementations of some embodiments, the method may further include steps for generating laser point cloud reflected value map. The steps may include: dividing a ground plane of an earth surface in a world coordinate system into a plurality of map grids of a same size and shape, each map grid corresponding to a sample position; and storing a reflected value characteristic of a sample laser point cloud collected for each sample position in a map grid corresponding to the sample position. Typically, the laser point cloud reflected value map generation steps may be pre-performed before driving of the vehicle. Alternatively, the world coordinate system may adopt the Universal Transverse Mercator (UTM) coordinate system. Here, when the ground plane of an earth surface in a world coordinate system is divided into a plurality of map grids of a same size and shape, the world coordinate system may be first divided into blocks of the same size and shape, each block covering a certain range. In this way, when the size and arrangement rule of the block are known, the block in which the coordinate is located may be calculated based on the coordinate. Then, each block may be subdivided into m×n (e.g., 1024×1024) map grids, each map grid corresponding to a sample position. When storing a reflected value characteristic of a sample laser point cloud collected for each sample position in a map grid corresponding to the sample position, the point cloud data falling into the same map grid may be aggregated. The aggregated data is stored in each map grid, such that the amount of data in each block is fixed.

In some alternative implementations of some embodiments, the reflected value characteristic comprises a reflected value mean of the laser point cloud. In this case, the calculating measurement matching probabilities of matching the reflected value characteristic of the projection area with reflected value characteristics of map areas corresponding to sample positions may comprise: determining differences of reflected value means between the projection area and the map areas corresponding to the sample positions on the map grids; and weight-averaging the differences of the reflected value means on the map grids, by using the number of laser points corresponding to the projection area in the map grids as a weight, and determine the measurement matching probabilities of matching the reflected value characteristic of the projection area with the reflected value characteristics of the map areas corresponding to the sample positions based on the weight-averaged means. For example, the measurement matching probability may be obtained by formula (1).

$$P(z|x,y) = \alpha \frac{\sum_{i,j} |\mu^m_{i-x,j-y} - \mu^r_{i,j}| \cdot N^r_{i,j}}{\sum_{i,j} N^r_{i,j}} \quad (1)$$

In formula (1), z represents a measured value of all current frames, and $P(z|x,y)$ represents a matching probability of the sample position (x, y) corresponding to the vehicle currently in each grid estimated based on the measured value of the current frame. In the measured value, $\mu^m_{i-x,j-y}$ is the reflected value mean corresponding to the map grid in the laser point cloud reflected value map, $\mu^r_{i,j}$, $N^r_{i,j}$ is the reflected value mean and the number of laser points of the area corresponding to the map grid in the projection area. $\alpha$ is a constant parameter. According to the above method, the measurement matching probabilities of matching the reflected value characteristic of the projection area with the reflected value characteristics of the map areas corresponding to the sample positions may be calculated respectively. Alternatively, the reflected value characteristic may further include the reflected value variance of the laser point cloud. In this case, the measurement matching probability may be calculated by other corresponding probability calculation formulas. This implementation may use the reflected value mean in combination with the number of the laser points as a factor to calculate the matching probability, which can effectively suppress the problem of the matching instability introduced by the small change gradient of the reflected value.

In some alternative implementations of some embodiments, the generating a coordinate of the map matching position, based on coordinates of the sample positions and the corresponding measurement matching probabilities may comprise: determining prediction probabilities of the vehicle at the sample positions at the current moment, based on the a priori position and an a priori deviation distribution of the a priori position obtained by time-updating the Kalman filter; amending the measurement matching probabilities by using the prediction probabilities of the sample positions to obtain a posteriori matching probabilities; and weight-averaging the coordinates of the sample positions, by using the a posteriori matching probabilities corresponding to the sample positions as a weight, to obtain the coordinate corresponding to the map matching position. In this implementation, the system also maintains a probability estimating the vehicle is currently at (x, y) based solely on historical values, regardless of the measured value of the current frame, e.g., the prediction probability $\overline{P}(x,y)$. Here, the prediction probability $\overline{P}(x,y)$ may be determined by the a priori position and the deviation a priori distribution of the a priori position obtained by time-updating the Kalman filter. Then, the electronic device may amend the measurement matching probability $P(z|x,y)$ by using the prediction probability $\overline{P}(x,y)$, so as to obtain the a posteriori matching probability $P(x,y)$. Alternatively, the amending process may be shown in formula (2).

$$P(x,y) = \eta P(z|x,y)\overline{P}(x,y) \quad (2)$$

In formula (2), $\eta$ is the normalization coefficient.

After obtaining the a posteriori matching probabilities corresponding to the sample positions of each of the grids, the electronic device may weighted-average the coordinates of the sample positions, using the a posteriori matching probabilities corresponding to the sample positions as weights, to obtain the coordinate corresponding to the map matching position. Alternatively, the process may be characterized by formula (3), wherein $\alpha$ in formula (3) is a constant parameter.

$$x = \frac{\sum_{x,y} P(x,y)^\alpha \cdot x}{\sum_{x,y} P(x,y)^\alpha}, y = \frac{\sum_{x,y} P(x,y)^\alpha \cdot y}{\sum_{x,y} P(x,y)^\alpha} \quad (3)$$

In some alternative implementations of some embodiments, the step 204 may include: setting a fused weight of the observation data obtained by observing each positioning satellite at the current moment by the vehicle-mounted GNSS receiver of the vehicle, based on the a priori position. The fused weight may be used to select the observation data for calculation and calculate the weight of the data when performing satellite positioning in the subsequent steps. That is, the electronic device may perform fusion calculation on the observation data corresponding to at least one positioning satellite based on the weight, to obtain the satellite positioning position. For example, when the weight of a certain positioning satellite is 0, the observation data corresponding to the positioning satellite may be discarded when obtaining the satellite positioning position of the vehicle. This implementation may use the a priori position to set the influence degree of the observation data corresponding to the satellites on the positioning result, which helps to improve the positioning accuracy.

In some alternative implementations of some embodiments, the step 204 may include: calculating a distance between the vehicle and the each positioning satellite based on the a priori position and a satellite position of the each positioning satellite, to obtain a calculated value; acquiring an observation value of the distance between the vehicle and the each positioning satellite obtained by observing each positioning satellite by the vehicle-mounted GNSS receiver, to determine a residual deviation of the distance corresponding to the each positioning satellite; and setting the weight of the observation data corresponding to the positioning satellite based on the residual deviation corresponding to the each positioning satellite, wherein the weight corresponding to the positioning satellite is inversely related to the residual deviation of the distance corresponding to the positioning satellite. This implementation may verify the reliability of the observed values corresponding to the satellites by using distance calculation values back-calculated with the a priori position, so as to reduce the weight of the less reliable data, or even directly discard some data including large deviation, which helps to improve the positioning accuracy.

In some alternative implementations of some embodiments, the step 204 may further include: constructing a pseudorange observation equation and a carrier single-difference observation equation between the previous positioning moment and the current moment, and setting a difference of the a priori position and the positioning result at the previous positioning moment as an initial value of a coordinate increment in the pseudorange observation equation and the carrier single-difference observation equation; determining and repair a carrier phrase cycle slip of a global positioning system corresponding to the vehicle-mounted GNSS receiver, based on the pseudorange observation equation and the carrier single-difference observation equation, and performing a robust estimation on the coordinate increment and a clock offset change to obtain an estimated value; constructing a double difference observation equation between a base station corresponding to the GNSS receiver and the GNSS receiver, and setting the estimated value as an initial value of a coordinate increment and a clock offset change in the double difference observation equation; fixing a double difference ambiguity in the double difference observation equation by using a LAMBDA algorithm, to update the coordinate increment and the clock offset change; and determining the satellite positioning position by using an updated coordinate increment and the positioning result at the previous positioning moment.

In this implementation, the a priori position may be used to perform a cycle slip detection and repair on the GNSS receiver. In practice, when positioning using the observation data corresponding to each satellite, the cycle-slip detection and the displacement estimation may be performed first based on the carrier time difference. Specifically, the pseudorange and carrier single-difference observation equations may be constructed between adjacent epochs (e.g., the previous positioning moment and the current positioning moment), and the two equations are shown in formula (4).

$$\rho_{k,k-1}{}^i = r_{k,k-1}{}^i + l_{k,k-1}{}^i \cdot dx + dt_{k,k-1} \cdot C + T_{k,k-1}{}^i + l_{k,k-1}{}^i + \varepsilon \lambda \varphi_{k,k-1}{}^i + \lambda \cdot N_{k,k-1}{}^i = r_{k,k-1}{}^i + l_{k,k-1}{}^i \cdot dx + dt_{k,k-1} \cdot C + T_{k,k-1}{}^i - l_{k,k-1}{}^i + \varepsilon \quad (4)$$

Here, $\rho_{k,k-1}{}^i$ is the change value of the pseudorange between the satellite and the earth, $r_{k,k-1}{}^i$ is the change value of the distance between the satellite and the earth, $dt_{k,k-1}$ is the clock offset change between the satellite and the receiver, $T_{k,k-1}{}^i$ and $l_{k,k-1}{}^i$ are respectively the observation distance deviations caused by the change of the troposphere and ionosphere delay. $\varepsilon$ is the noise constant, $\varphi_{k,k-1}{}^i$ is the phase change observed by the receiver, $N_{k,k-1}{}^i$ is the cycle slip value of the carrier phase, $l_{k,k-1}{}^i$ is the cosine on the observation direction, and dx is the to-be-estimated state quantity, including the coordinate increment and the clock offset change.

When the GNSS update frequency is large (for example, 10 Hz) in the present system of some embodiments, the change of the troposphere and ionosphere may be considered as minor in one update, and formula (5) may be satisfied.

$$\rho_{k,k-1}{}^i = r_{k,k-1}{}^i + l_{k,k-1}{}^i \cdot dx + dt_{k,k-1} \cdot C + \varepsilon \lambda \varphi_{k,k-1}{}^i + \lambda \cdot N_{k,k-1}{}^i = r_{k,k-1}{}^i + l_{k,k-1}{}^i \cdot dx \cdot dt_{k,k-1} \cdot C + \varepsilon \quad (5)$$

Calculating formula (5) and the value of $N_{k,k-1}{}^i$ may be obtained. When $N_{k,k-1}{}^i = 0$, no cycle slip occurred. Otherwise, it is required to repair the cycle slip based on the calculated cycle slip value. In addition, dx and $dt_{k,k-1}$ may also be estimated using the robust estimation to obtained an estimated value.

Then, the carrier phase differential positioning may be performed by using and combining the observation data provided by the base station. During the carrier phase differential positioning, a double difference observation equation may be constructed first as shown in equation (6). The initial value of the coordinate increment and the clock offset change in the double difference observation equation, e.g., the initial value of dx in formula (6), may use the foregoing estimated value.

$$\lambda \varphi_{AB}{}^{ij} + \lambda \cdot N_{AB}{}^{ij} = r_{AB}{}^{ij} + l_{AB}{}^{ij} \cdot dx + \varepsilon \rho_{AB}{}^{ij} = r_{AB}{}^{ij} + l_{AB}{}^{ij} \cdot dx + \varepsilon \quad (6)$$

For formula (6), the LAMBDA algorithm may be used to fix the double difference ambiguity, to update the estimated value of dx to obtain the updated coordinate increment and clock offset change. The electronic device may use the updated coordinate increment and the positioning result of the previous positioning moment to determine the satellite positioning position. This implementation may perform the cycle slip repair in time using the a priori position provided by the inertial navigation system, such that when frequent occurrence of cycle slips occurs in the carrier phase due to an influence such as the GNSS signal being blocked in a typical urban environment, the positioning would not be seriously impacted for the delay in detection and repairing of the cycle slip. It can be seen that this method may reduce the deviation as much as possible to ensure the positioning accuracy of the carrier phase differential positioning.

The method provided by the embodiments of the present disclosure uses the a priori position predicted by the inertial navigation system to determine the map area for searching for map matching, and may use the a priori position to assist satellite positioning, such that the computational amount in the map matching flow and the satellite positioning may be greatly reduced based on the a priori position. The method greatly improves the processing efficiency of the fusion positioning, so that the positioning data of the three modes can be timely fused to generate an accurate positioning result.

Figure 4:
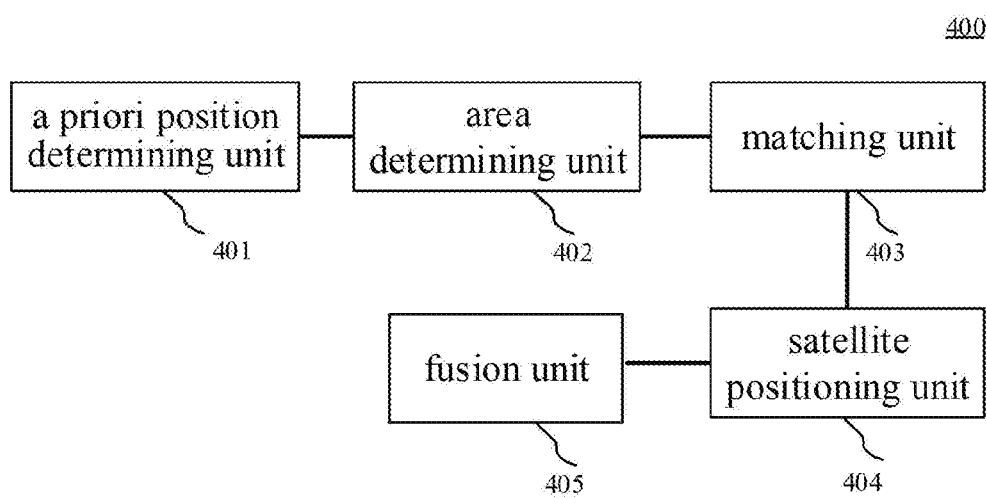
FIG. 4 is a schematic structural diagram of an embodiment of an apparatus for positioning a vehicle according to some embodiments of the present disclosure.

With further reference to FIG. 4, as an implementation to the method shown in the above figures, the present disclosure provides an embodiment of an apparatus for positioning a vehicle. The apparatus embodiment corresponds to the method embodiment shown in FIG. 2, and the apparatus may be specifically applied to vehicles or positioning servers.

As shown in FIG. 4, the apparatus 400 for positioning a vehicle includes: an a priori position determining unit 401, an area determining unit 402, a matching unit 403, a satellite positioning unit 404 and a fusion unit 405. Here, the a priori position determining unit 401 is configured to acquire an a priori position of a to-be-positioned vehicle at a current positioning moment determined by performing a strapdown calculation between a previous positioning moment and the current positioning moment by a vehicle-mounted inertial navigation system of the to-be-positioned vehicle. The area determining unit 402 is configured to determine a map area for searching and including a predetermined range in a laser point cloud reflected value map by using the a priori position. The matching unit 403 is configured to match a reflected value characteristic of a projection area generated by projecting a real-time laser point cloud collected by scanning a surrounding environment by a vehicle-mounted laser radar of the vehicle at the current positioning moment with a reflected value characteristic of the map area for searching, to obtain a map matching position according to a matching result. The satellite positioning unit 404 is configured to position, using the a priori position in combination with observation data of a vehicle-mounted global navigation satellite system (GNSS) receiver of the vehicle, to obtain a satellite positioning position. The fusion unit 405 is configured to fuse the a priori position, the map matching position and the satellite positioning position to generate a positioning result of positioning the vehicle at the current moment.

In some embodiments, the specific processing of the a priori position determining unit 401, the area determining unit 402, the matching unit 403, the satellite positioning unit 404 and the fusion unit 405 of the apparatus 400 for positioning a vehicle may respectively refer to the steps 201, 202, 203, 204 and 205 in the corresponding embodiment in FIG. 2, and detailed description thereof is omitted.

In some alternative implementations of some embodiments, the apparatus 400 further includes: a time-updating unit (not shown), configured to time-update a Kalman filter including a vehicle position deviation, a vehicle speed deviation, a vehicle attitude deviation, a zero bias deviation of an accelerometer and a gyroscope in the vehicle-mounted inertial navigation system of the vehicle at each positioning moment and a clock offset and a clock drift of the vehicle-mounted global navigation satellite system (GNSS) receiver as state variables; and, the fusion unit 405 is further configured to: determine a difference between the map matching position and the a priori position and/or a difference between the satellite positioning position and the a priori position as an observation value of the Kalman filter, and measurement-update the Kalman filter; and amend the a priori position by using a measurement-updated vehicle position deviation to generate the positioning result. The specific processing of this implementation may refer to the relevant implementation in the corresponding embodiment in FIG. 2, and detailed description thereof is omitted.

In some alternative implementations of some embodiments, the matching unit 403 includes: a calculation subunit (not shown), configured to calculate measurement matching probabilities of matching the reflected value characteristic of the projection area with reflected value characteristics of map areas corresponding to sample positions of the map area for searching; and a generation subunit (not shown), configured to generate a coordinate of the map matching position, based on coordinates of the sample positions and the corresponding measurement matching probabilities. The specific processing of this implementation may refer to the relevant implementation in the corresponding embodiment in FIG. 2, and detailed description thereof is omitted.

In some alternative implementations of some embodiments, the matching unit 403 further includes: a determining subunit (not shown), configured to, for each sample position, overlap a center of the projection area with the sample position, and determine an area in the laser point cloud reflected value map overlapping the projection area as the map area corresponding to the sample position. The specific processing of this implementation may refer to the relevant implementation in the corresponding embodiment in FIG. 2, and detailed description thereof is omitted.

In some alternative implementations of some embodiments, the apparatus 400 further includes a laser point cloud reflected value map generation unit (not shown). The laser point cloud reflected value map generation unit may be configured to: divide a ground plane of an earth surface in a world coordinate system into a plurality of map grids of a same size and shape, each map grid corresponding to a sample position; and store a reflected value characteristic of a sample laser point cloud collected for each sample position in a map grid corresponding to the sample position. The specific processing of this implementation may refer to the relevant implementation in the corresponding embodiment in FIG. 2, and detailed description thereof is omitted.

In some alternative implementations of some embodiments, the reflected value characteristic comprises a reflected value mean of the laser point cloud; and, the calculation subunit is further configured to: determine differences of reflected value means between the projection area and the map areas corresponding to the sample positions on the map grids; and weight-average the differences of the reflected value means on the map grids, by using the number of laser points corresponding to the projection area in the map grids as a weight, and determine the measurement matching probabilities of matching the reflected value characteristic of the projection area with the reflected value characteristics of the map areas corresponding to the sample positions based on the weight-averaged means. The specific processing of this implementation may refer to the relevant implementation in the corresponding embodiment in FIG. 2, and detailed description thereof is omitted.

In some alternative implementations of some embodiments, the generation subunit is further configured to: determine prediction probabilities of the vehicle at the sample positions at the current moment, based on the a priori position and an a priori deviation distribution of the a priori position obtained by time-updating the Kalman filter; amend the measurement matching probabilities by using the prediction probabilities of the sample positions to obtain a posteriori matching probabilities; and weight-average the coordinates of the sample positions, by using the a posteriori matching probabilities corresponding to the sample positions as a weight, to obtain the coordinate corresponding to the map matching position. The specific processing of this implementation may refer to the relevant implementation in the corresponding embodiment in FIG. 2, and detailed description thereof is omitted.

In some alternative implementations of some embodiments, the satellite positioning unit 404 includes: a setting subunit (not shown), configured to set a fused weight of the observation data obtained by observing each positioning satellite at the current moment by the vehicle-mounted GNSS receiver of the vehicle, based on the a priori position. The specific processing of this implementation may refer to the relevant implementation in the corresponding embodiment in FIG. 2, and detailed description thereof is omitted.

In some alternative implementations of some embodiments, the setting subunit is further configured to: calculate a distance between the vehicle and the each positioning satellite based on the a priori position and a satellite position of the each positioning satellite, to obtain a calculated value; acquire an observation value of the distance between the vehicle and the each positioning satellite obtained by observing each positioning satellite by the vehicle-mounted GNSS receiver, to determine a residual deviation of the distance corresponding to the each positioning satellite; and set the weight of the observation data corresponding to the positioning satellite based on the residual deviation corresponding to the each positioning satellite, wherein the weight corresponding to the positioning satellite is inversely related to the residual deviation of the distance corresponding to the positioning satellite. The specific processing of this implementation may refer to the relevant implementation in the corresponding embodiment in FIG. 2, and detailed description thereof is omitted.

In some alternative implementations of some embodiments, the satellite positioning unit further includes a cycle slip repairing subunit, configured to: construct a pseudorange observation equation and a carrier single-difference observation equation between the previous positioning moment and the current moment, set a difference of the a priori position and the positioning result at the previous positioning moment as an initial value of a coordinate increment in the pseudorange observation equation and the carrier single-difference observation equation; determine and repair a carrier phrase cycle slip of a global positioning system corresponding to the vehicle-mounted GNSS receiver, based on the pseudorange observation equation and the carrier single-difference observation equation, and perform a robust estimation on the coordinate increment and a clock offset change to obtain an estimated value; construct a double difference observation equation between a base station corresponding to the GNSS receiver and the GNSS receiver, and set the estimated value as an initial value of a coordinate increment and a clock offset change in the double difference observation equation; fix a double difference ambiguity in the double difference observation equation by using a LAMBDA algorithm, to update the coordinate increment and the clock offset change; and determine the satellite positioning position by using an updated coordinate increment and the positioning result at the previous positioning moment. The specific processing of this implementation may refer to the relevant implementation in the corresponding embodiment in FIG. 2, and detailed description thereof is omitted.

Figure 5:
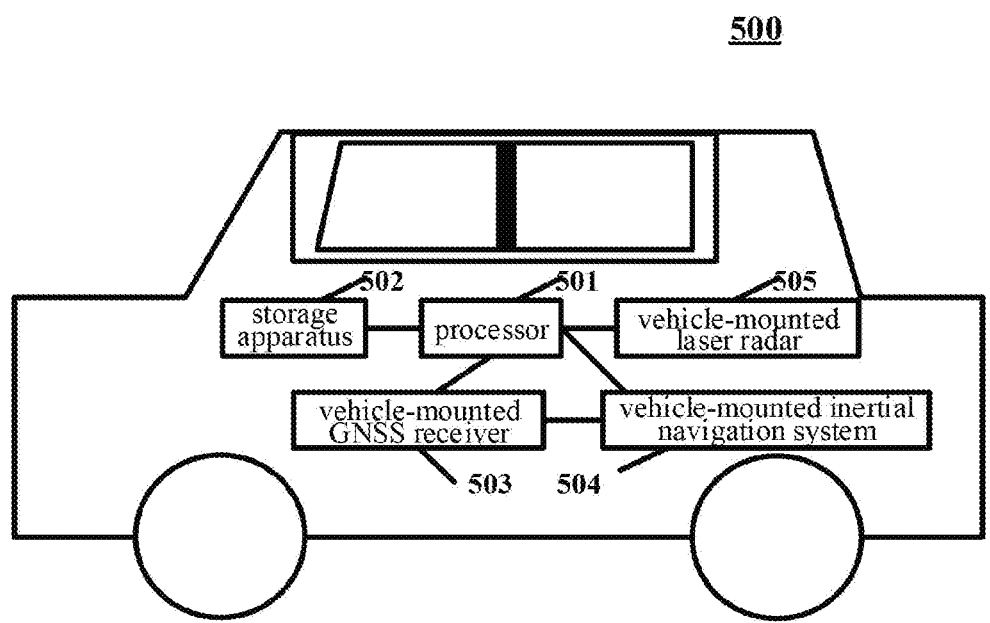
FIG. 5 is a schematic structural diagram of a vehicle according to some embodiments of the present disclosure.

With reference to FIG. 5, the present disclosure also provides an embodiment of a vehicle. As shown in FIG. 5, the vehicle 500 includes: one or more processors 501; a storage apparatus 502, to store one or more programs; a vehicle-mounted GNSS receiver 503; a vehicle-mounted inertial navigation system 504 and a vehicle-mounted laser radar 505. When the one or more programs being executed by the processor 501, cause the processor 501 to implement a method as described in the corresponding embodiment or any of the implementations as in FIG. 2.

In addition, the present disclosure also provides an embodiment of a positioning server, the positioning server includes: one or more processors; a storage apparatus, to store one or more programs; and when the one or more programs being executed by the one or more processors, cause the one or more processors to implement a method as described in the corresponding embodiment or any of the implementations as in FIG. 2.

Figure 6:
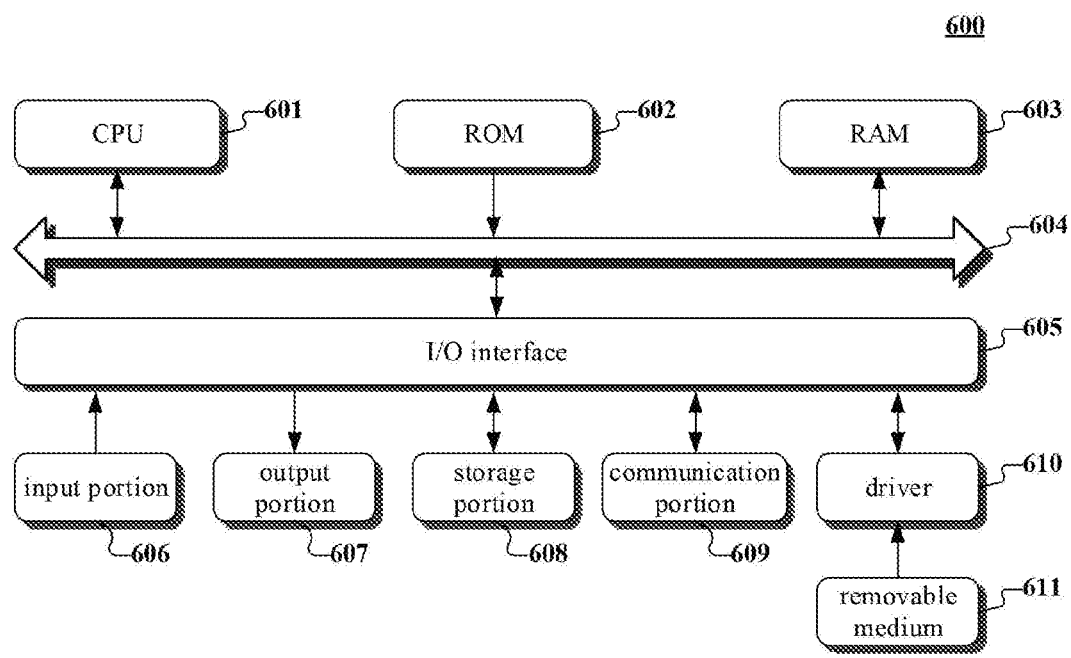
FIG. 6 is a schematic structural diagram of a computer system adapted to implement a vehicle-mounted computing device or a positioning server of the vehicle of some embodiments of the present disclosure.

With reference to FIG. 6, a schematic structural diagram of a computer system 600 adapted to implement a vehicle-mounted computing device or a positioning server of the vehicle of some embodiments of the present disclosure is illustrated. The computer system shown in FIG. 6 is merely an example and should not impose any restriction on the functions and the scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising an a priori position determining unit, an area determining unit, a matching unit, a satellite positioning unit and a fusion unit, where the names of these units or modules do not in some cases constitute a limitation to such units or modules themselves. For example, the fusion unit may also be described as "a unit for fusing the a priori position, the map matching position and the satellite positioning position to generate a positioning result of positioning the vehicle at the current moment."

In another aspect, some embodiments of the present disclosure further provide a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: acquire an a priori position of a to-be-positioned vehicle at a current positioning moment determined by performing a strapdown calculation between a previous positioning moment and the current positioning moment by a vehicle-mounted inertial navigation system of the to-be-positioned vehicle; determine a map area for searching and including a predetermined range in a laser point cloud reflected value map by using the a priori position; match a reflected value characteristic of a projection area generated by projecting a real-time laser point cloud collected by scanning a surrounding environment by a vehicle-mounted laser radar of the vehicle at the current positioning moment with a reflected value characteristic of the map area for searching, to obtain a map matching position according to a matching result; position, using the a priori position in combination with observation data of a vehicle-mounted global navigation satellite system (GNSS) receiver of the vehicle, to obtain a satellite positioning position; and fuse the a priori position, the map matching position and the satellite positioning position to generate a positioning result of positioning the vehicle at the current moment.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for positioning a vehicle, the method comprising:
    acquiring a priori position of a to-be-positioned vehicle at a current positioning moment determined by performing a strapdown calculation between a previous positioning moment and the current positioning moment by a vehicle-mounted inertial navigation system of the to-be-positioned vehicle;
    determining a map area, having a predetermined range, for searching in a laser point cloud reflected value map by using the priori position, the laser point cloud reflected value map being a map generated based on reflected value characteristics of projection areas after projecting pre-collected laser point clouds;
    matching a first reflected value characteristic of a projection area generated by projecting a real-time laser point cloud collected by scanning a surrounding environment through a vehicle-mounted Light Detection and Ranging (lidar) of the vehicle at the current positioning moment with a second reflected value characteristic of the map area for searching to obtain a matching result, and determining a map matching position according to the matching result;
    positioning, using the priori position in combination with observation data of a vehicle-mounted global navigation satellite system (GNSS) receiver of the vehicle, to obtain a satellite positioning position at the current positioning moment; and fusing the priori position, the map matching position and the satellite positioning position to generate a positioning result of positioning the vehicle at the current positioning moment, wherein the method is performed by at least one processor.

2. The method according to claim 1, further comprising:

time-updating a Kalman filter having a vehicle position deviation, a vehicle speed deviation, a vehicle attitude deviation, a zero bias deviation of an accelerometer and a gyroscope in the vehicle-mounted inertial navigation system of the vehicle at each positioning moment and a clock offset and a clock drift of the vehicle-mounted global navigation satellite system (GNSS) receiver as state variables; and fusing the priori position, the map matching position and the satellite positioning position to generate a positioning result of positioning the vehicle at the current positioning moment comprising:

determining a difference between the map matching position and the priori position and/or a difference between the satellite positioning position and the priori position as an observation value of the Kalman filter, and measurement-updating the Kalman filter; and amending the priori position by using a measurement-updated vehicle position deviation to generate the positioning result.

3. The method according to claim 2, wherein matching the first reflected value characteristic of the projection area generated by projecting the real-time laser point cloud collected by scanning the surrounding environment through the vehicle-mounted lidar of the vehicle at the current positioning moment with the second reflected value characteristic of the map area for searching to obtain the matching result, and determining the map matching position according to the matching result comprises:

calculating measurement matching probabilities of matching the first reflected value characteristic of the projection area with the second reflected value characteristic including reflected value characteristics of map areas corresponding to sample positions of the map area for searching; and generating a coordinate of the map matching position, based on coordinates of the sample positions and the corresponding measurement matching probabilities.

4. The method according to claim 3, wherein matching the first reflected value characteristic of the projection area generated by projecting the real-time laser point cloud collected by scanning the surrounding environment through the vehicle-mounted lidar of the vehicle at the current positioning moment with the second reflected value characteristic of the map area for searching to obtain the matching result, and determining the map matching position according to a matching result further comprises:

for each sample position, overlapping a center of the projection area with the sample position, and determining an area in the laser point cloud reflected value map overlapping the projection area as the map area corresponding to the sample position.

5. The method according to claim 3, wherein the method further comprises generating the laser point cloud reflected value map, the generating comprising:

dividing a ground plane of an earth surface in a world coordinate system into a plurality of map grids of a same size and shape, each map grid corresponding to a sample position; and storing a reflected value characteristic of a sample laser point cloud collected for each sample position in a map grid corresponding to the sample position.

6. The method according to claim 5, wherein the reflected value characteristic comprises a reflected value mean of the laser point cloud; and calculating measurement matching probabilities of matching the reflected value characteristic of the projection area with reflected value characteristics of map areas corresponding to sample positions comprises:

determining differences of reflected value means between the projection area and the map areas corresponding to the sample positions on the map grids; and weight-averaging the differences of the reflected value means on the map grids, by using a number of laser points corresponding to the projection area in the map grids as a weight, and determining the measurement matching probabilities of matching the reflected value characteristic of the projection area with the reflected value characteristics of the map areas corresponding to the sample positions based on the weight-averaged means.

7. The method according to claim 3, wherein generating the coordinate of the map matching position, based on coordinates of the sample positions and the corresponding measurement matching probabilities comprises:

determining prediction probabilities of the vehicle at the sample positions at the current positioning moment, based on the priori position and an priori deviation distribution of the priori position obtained by time-updating the Kalman filter;

amending the measurement matching probabilities by using the prediction probabilities of the sample positions to obtain a posteriori matching probabilities; and weight-averaging the coordinates of the sample positions, by using the posteriori matching probabilities corresponding to the sample positions as a weight, to obtain the coordinate corresponding to the map matching position.

8. The method according to claim 2, wherein positioning, using the priori position in combination with observation data of a vehicle-mounted GNSS receiver of the vehicle, to obtain a satellite positioning position comprises:

setting a fused weight of the observation data obtained by observing each positioning satellite at the current positioning moment by the vehicle-mounted GNSS receiver of the vehicle, based on the priori position.

9. The method according to claim 8, wherein setting the fused weight of the observation data obtained by observing each positioning satellite at the current positioning moment by the vehicle-mounted GNSS receiver of the vehicle, based on the priori position comprises:

calculating a distance between the vehicle and the each positioning satellite based on the priori position and a satellite position of the each positioning satellite, to obtain a calculated value;

acquiring an observation value of the distance between the vehicle and the each positioning satellite obtained by observing the each positioning satellite by the vehicle-mounted GNSS receiver, to determine a residual deviation of the distance corresponding to the each positioning satellite; and setting the weight of the observation data corresponding to the positioning satellite based on the residual deviation corresponding to the each positioning satellite, wherein the weight corresponding to the positioning satellite is inversely related to the residual deviation of the distance corresponding to the positioning satellite.

10. The method according to claim 8, wherein positioning, using the priori position in combination with observation data of the vehicle-mounted GNSS receiver of the vehicle, to obtain a satellite positioning position comprises:

constructing a pseudorange observation equation and a carrier single-difference observation equation between the previous positioning moment and the current positioning moment, and setting a difference of the priori position and the positioning result at the previous positioning moment as an initial value of a coordinate increment in the pseudorange observation equation and the carrier single-difference observation equation;

determining and repairing a carrier phrase cycle slip of a global positioning system corresponding to the vehicle-mounted GNSS receiver, based on the pseudorange observation equation and the carrier single-difference observation equation, and performing a robust estimation on the coordinate increment and a clock offset change to obtain an estimated value;

constructing a double difference observation equation between a base station corresponding to the GNSS receiver and the GNSS receiver, and setting the estimated value as the initial value of the coordinate increment and the clock offset change in the double difference observation equation;

fixing a double difference ambiguity in the double difference observation equation by using a LAMBDA algorithm, to update the coordinate increment and the clock offset change; and determining the satellite positioning position by using the updated coordinate increment and the positioning result at the previous positioning moment.

11. An apparatus for positioning a vehicle, the apparatus comprising:

at least one processor; and a non-transitory computer storage medium storing instructions that, when executed by the at least one processor, cause the at least one processor to perform operations comprising:

acquiring a priori position of a to-be-positioned vehicle at a current positioning moment determined by performing a strapdown calculation between a previous positioning moment and the current positioning moment by a vehicle-mounted inertial navigation system of the to-be-positioned vehicle;

determining a map area, having a predetermined range, for searching in a laser point cloud reflected value map by using the priori position, the laser point cloud reflected value map being a map generated based on reflected value characteristics of projection areas after projecting pre-collected point clouds;

matching a first reflected value characteristic of a projection area generated by projecting a real-time laser point cloud collected by scanning a surrounding environment through a vehicle-mounted Light Detection and Ranging (lidar) of the vehicle at the current positioning moment with a second reflected value characteristic of the map area for searching to obtain a matching result, and determining a map matching position according to the matching result;

positioning, using the priori position in combination with observation data of a vehicle-mounted global navigation satellite system (GNSS) receiver of the vehicle, to obtain a satellite positioning position at the current positioning moment; and fusing the priori position, the map matching position and the satellite positioning position to generate a positioning result of positioning the vehicle at the current positioning moment.

12. The apparatus according to claim 11, wherein the operations further comprise:

time-updating a Kalman filter having a vehicle position deviation, a vehicle speed deviation, a vehicle attitude deviation, a zero bias deviation of an accelerometer and a gyroscope in the vehicle-mounted inertial navigation system of the vehicle at each positioning moment and a clock offset and a clock drift of the vehicle-mounted global navigation satellite system (GNSS) receiver as state variables; and fusing the priori position, the map matching position and the satellite positioning position to generate a positioning result of positioning the vehicle at the current moment comprises:

determining a difference between the map matching position and the priori position and/or a difference between the satellite positioning position and the priori position as an observation value of the Kalman filter, and measurement-updating the Kalman filter; and amending the priori position by using a measurement-updated vehicle position deviation to generate the positioning result.

13. The apparatus according to claim 12, wherein matching the first reflected value characteristic of the projection area generated by projecting the real-time laser point cloud collected by scanning the surrounding environment through the vehicle-mounted lidar of the vehicle at the current positioning moment with the second reflected value characteristic of the map area for searching to obtain the matching result, and determining the map matching position according to the matching result comprises:

calculating measurement matching probabilities of matching the first reflected value characteristic of the projection area with the second reflected value characteristic including reflected value characteristics of map areas corresponding to sample positions of the map area for searching; and generating a coordinate of the map matching position, based on coordinates of the sample positions and the corresponding measurement matching probabilities.

14. The apparatus according to claim 13, wherein matching the first reflected value characteristic of the projection area generated by projecting the real-time laser point cloud collected by scanning the surrounding environment through the vehicle-mounted lidar of the vehicle at the current positioning moment with the second reflected value characteristic of the map area for searching to obtain the matching result, and determining the map matching position according to the matching result further comprises:

for each sample position, overlapping a center of the projection area with the sample position, and determining an area in the laser point cloud reflected value map overlapping the projection area as the map area corresponding to the sample position.

15. The apparatus according to claim 13, wherein the operations further comprise generating the laser point cloud reflected value map, the generating comprising:

dividing a ground plane of an earth surface in a world coordinate system into a plurality of map grids of a same size and shape, each map grid corresponding to a sample position; and storing a reflected value characteristic of a sample laser point cloud collected for each sample position in a map grid corresponding to the sample position.

16. The apparatus according to claim 15, wherein the reflected value characteristic comprises a reflected value mean of the laser point cloud; and calculating measurement matching probabilities of matching the reflected value characteristic of the projection area with reflected value characteristics of map areas corresponding to sample positions comprises:

determining differences of reflected value means between the projection area and the map areas corresponding to the sample positions on the map grids; and weight-averaging the differences of the reflected value means on the map grids, by using a number of laser points corresponding to the projection area in the map grids as a weight, and determining the measurement matching probabilities of matching the reflected value characteristic of the projection area with the reflected value characteristics of the map areas corresponding to the sample positions based on the weight-averaged means.

17. The apparatus according to claim 13, wherein generating the coordinate of the map matching position, based on coordinates of the sample positions and the corresponding measurement matching probabilities comprises:

determining prediction probabilities of the vehicle at the sample positions at the current positioning moment, based on the priori position and an priori deviation distribution of the priori position obtained by time-updating the Kalman filter;

amending the measurement matching probabilities by using the prediction probabilities of the sample positions to obtain a posteriori matching probabilities; and weight-averaging the coordinates of the sample positions, by using the posteriori matching probabilities corresponding to the sample positions as a weight, to obtain the coordinate corresponding to the map matching position.

18. The apparatus according to claim 12, wherein positioning, using the priori position in combination with observation data of a vehicle-mounted GNSS receiver of the vehicle, to obtain a satellite positioning position comprises:

setting a fused weight of the observation data obtained by observing each positioning satellite at the current positioning moment by the vehicle-mounted GNSS receiver of the vehicle, based on the priori position.

19. The apparatus according to claim 18, wherein setting the fused weight of the observation data obtained by observing each positioning satellite at the current positioning moment by the vehicle-mounted GNSS receiver of the vehicle, based on the priori position comprises:

calculating a distance between the vehicle and the each positioning satellite based on the priori position and a satellite position of the each positioning satellite, to obtain a calculated value;

acquiring an observation value of the distance between the vehicle and the each positioning satellite obtained by observing each positioning satellite by the vehicle-mounted GNSS receiver, to determine a residual deviation of the distance corresponding to the each positioning satellite; and setting the weight of the observation data corresponding to the positioning satellite based on the residual deviation corresponding to the each positioning satellite, wherein the weight corresponding to the positioning satellite is inversely related to the residual deviation of the distance corresponding to the positioning satellite.

20. The apparatus according to claim 18, wherein positioning, using the priori position in combination with observation data of the vehicle-mounted GNSS receiver of the vehicle, to obtain a satellite positioning position comprises:

constructing a pseudorange observation equation and a carrier single-difference observation equation between the previous positioning moment and the current positioning moment, and setting a difference of the priori position and the positioning result at the previous positioning moment as an initial value of a coordinate increment in the pseudorange observation equation and the carrier single-difference observation equation;

determining and repair a carrier phrase cycle slip of a global positioning system corresponding to the vehicle-mounted GNSS receiver, based on the pseudorange observation equation and the carrier single-difference observation equation, and performing a robust estimation on the coordinate increment and a clock offset change to obtain an estimated value;

constructing a double difference observation equation between a base station corresponding to the GNSS receiver and the GNSS receiver, and setting the estimated value as the initial value of the coordinate increment and the clock offset change in the double difference observation equation;

fixing a double difference ambiguity in the double difference observation equation by using a LAMBDA algorithm, to update the coordinate increment and the clock offset change; and determining the satellite positioning position by using the updated coordinate increment and the positioning result at the previous positioning moment.

21. A vehicle, comprising:

one or more processors; and a vehicle-mounted global navigation satellite system GNSS receiver, a vehicle-mounted inertial navigation system and a vehicle-mounted Light Detection and Ranging (lidar);

wherein the one or more processors are configured to perform operations comprising:

acquiring a priori position of the vehicle at a current positioning moment determined by preforming a strap-down calculation between a previous positioning moment and the current positioning moment by the vehicle-mounted inertial navigation system of the vehicle;

determining a map area, having a predetermined range, for searching in a laser point cloud reflected value map by using the priori position, the laser point cloud reflected value map being a map generated based on reflected value characteristics of projection areas after projecting pre-collected laser point clouds;

matching a first reflected value characteristic of a projection area generated by projecting a real-time laser point cloud collected by scanning a surrounding environment through the vehicle-mounted lidar of the vehicle at the current positioning moment with a second reflected value characteristic of the map area for searching to obtain a matching result, and determining a map matching positioning according to matching result;

positioning, using the priori position in combination with observation data of the vehicle-mounted GNSS receiver of the vehicle, to obtain a satellite positioning position at the current positioning moment; and fusing the priori position, the map matching position and the satellite positioning position to generate a positioning result of positioning the vehicle at the current positioning moment.

* * * * *

UNITED STATES PATENT AND TRADEMARK OFFICE
CERTIFICATE OF CORRECTION

PATENT NO. : 11,009,355 B2
APPLICATION NO. : 15/876008
DATED : May 18, 2021
INVENTOR(S) : Renlan Cai It is certified that error appears in the above-identified patent and that said Letters Patent is hereby corrected as shown below:

In the Claims

In Column 23, Line 58, Claim 11, before "point" insert --laser--.

In Column 26, Line 43, Claim 21, delete "GNSS" and insert --(GNSS)--.

In Column 26, Line 67, Claim 21, delete "positioning" and insert --position--.

In Column 26, Line 67, Claim 21, after "to" insert --the--.

Signed and Sealed this
Fourteenth Day of June, 2022

Katherine Kelly Vidal
*Director of the United States Patent and Trademark Office*